(12) United States Patent
Holt

(10) Patent No.: US 8,218,902 B1
(45) Date of Patent: Jul. 10, 2012

(54) PORTABLE ELECTRONIC DEVICE POSITION SENSING CIRCUIT

(75) Inventor: Jason Holt, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/323,335

(22) Filed: Dec. 12, 2011

(51) Int. Cl.
*G06K 9/32* (2006.01)
*G06K 9/36* (2006.01)

(52) U.S. Cl. ............ 382/284; 382/291; 382/294

(58) Field of Classification Search .......... 382/284, 382/291, 294
See application file for complete search history.

(56) References Cited

U.S. PATENT DOCUMENTS

| | | | |
|---|---|---|---|
| 5,479,519 A | 12/1995 | Davis | |
| 6,205,399 B1 * | 3/2001 | Ogino et al. | 701/521 |
| 6,778,674 B1 * | 8/2004 | Panasik et al. | 381/313 |
| 6,952,672 B2 * | 10/2005 | Smith | 704/226 |
| 7,016,504 B1 * | 3/2006 | Shennib | 381/60 |
| 7,287,731 B2 | 10/2007 | Johnson | |
| 7,319,890 B2 * | 1/2008 | Fan et al. | 455/575.3 |
| 7,587,053 B1 * | 9/2009 | Pereira | 381/77 |
| 2002/0161577 A1 * | 10/2002 | Smith | 704/233 |
| 2002/0167862 A1 * | 11/2002 | Tomasi et al. | 367/118 |
| 2005/0043856 A1 * | 2/2005 | Bautista et al. | 700/244 |
| 2005/0141702 A1 * | 6/2005 | Fan et al. | 379/433.01 |
| 2005/0261024 A1 | 11/2005 | Jin | |
| 2007/0126700 A1 | 6/2007 | Wright | |
| 2008/0165146 A1 | 7/2008 | Matas | |
| 2009/0016730 A1 * | 1/2009 | Ko | 398/116 |
| 2009/0060170 A1 * | 3/2009 | Coughlan et al. | 379/433.02 |
| 2010/0322435 A1 * | 12/2010 | Suzuki et al. | 381/92 |

FOREIGN PATENT DOCUMENTS

JP 2002101491 A 4/2002

* cited by examiner

*Primary Examiner* — Aaron W Carter
(74) *Attorney, Agent, or Firm* — Shumaker & Sieffert, P.A.

(57) ABSTRACT

An electronic device includes a position sensing circuit that receives a tone from an audio signal output, modifies the tone, and returns the modified tone to audio signal input. The device's processor implements instructions to compare one or more characteristics of the modified signal to those of one or more reference signals to determine a pan/tilt measurement or other angular position of the device.

25 Claims, 4 Drawing Sheets

PORTABLE ELECTRONIC DEVICE POSITION SENSING CIRCUIT

BACKGROUND

Portable electronic devices, such as smart phones, personal digital assistants, laptop computers, tablet computing devices, and the like often are equipped with cameras. When a user takes a photo or video with the camera, the viewer may wish to photograph an area that is larger than the camera's field of view. In this situation, the user may photograph multiple adjacent fields of view and join the images together into a single larger, or panoramic, image. However, if the camera's pan or tilt changes between photos (i.e., if the camera moves left, right, up or down), the images may not match together well when joined together.

Measurements of positional change also may be important to other devices. This document describes methods and systems that can help monitor positional changes on an electronic device.

SUMMARY

In an embodiment, a method of sensing the position of an electronic device includes using an audio output of a portable electronic device to output a first tone that exhibits a first parameter value (such as a first amplitude or a first frequency). The device transmits the tone into a position sensing circuit. The position sensing circuit may include, a potentiometer, a digital rotary encoder or another type of angle transducer, or another suitable sensor. The device receives, from the position sensing circuit via an audio input, a second tone of a second parameter value. The processor determines an angular positional measurement by comparing the second parameter value (e.g., amplitude or frequency) to a reference parameter value.

In some embodiments, the angular positional measurement may be a pan/tilt measurement. If so, in some embodiments the device may include an optical sensor such as a camera. If so, the device may receive a camera operation command, capture image data substantially simultaneously with the receiving of the second tone, store the image data as an image file in a memory and store the pan/tilt measurement in a memory in association with the image file, such as in metadata or otherwise as part of the image file.

In some embodiments, determining the angular positional measurement may include measuring a difference between the reference parameter value and the second parameter value, accessing a stored plurality of known differences and corresponding angular positional values, and selecting as the angular positional measurement the angular positional value that corresponds to the known difference that most closely matches the measured difference. The method also may include determining that the image file corresponds to a reference image in an image sequence, setting the reference parameter value to equal the second parameter value, and repeating the step of determining an angular positional measurement for a plurality of additional images.

In an alternate embodiment, an electronic device includes an audio signal output, an audio signal input, and a position sensing circuit. The position sensing circuit may include, a potentiometer, a digital rotary encoder or another type of angle transducer, or another suitable sensor. The position sensing circuit is configured to receive a first signal from the audio signal output, modify the first signal to yield a modified signal, and direct the modified signal to the audio signal input.

The device also may include a processor, and a memory containing programming instructions that instruct the processor to cause the device to output the first signal via the audio signal output, and receive the second signal via the audio input. The first signal will have a first parameter value, and the modified signal has a second parameter value. In response to receiving a command, such as a command to capture an image via the optical sensor, the device may determine a pan/tilt measurement or other angular position by comparing the second parameter value to a reference parameter value.

The device also may include programming instructions that instruct the processor to cause the device to capture, by an optical sensor, the image substantially simultaneously with the receiving of the modified signal, store the image as an image file in a memory, and store the pan/tilt measurement in a memory in association with the image file.

The programming instructions that instruct the processor to cause the device to determine the angular positional measurement may include instructions to measure a difference between the reference parameter value and the second parameter value, access a stored plurality of known differences and corresponding angular positional values, and select as the angular positional measurement angular positional value that corresponds to the known difference that most closely matches the measured difference.

The programming instructions also may instruct the processor to determine that the image file corresponds to a reference image in an image sequence, set the parameter value amplitude to equal the second parameter value, and determine an angular positional measurement for each of a plurality of additional images.

In some embodiments, the audio signal input may include a first channel and a second channel, a first terminal of the position sensing circuit may be electrically connected to the first channel, and a second terminal of the position sensing circuit may be electrically connected to the second channel. The audio signal output and the audio signal input may be parts of separate ports, or they may both be elements of a single port.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Figure 1:
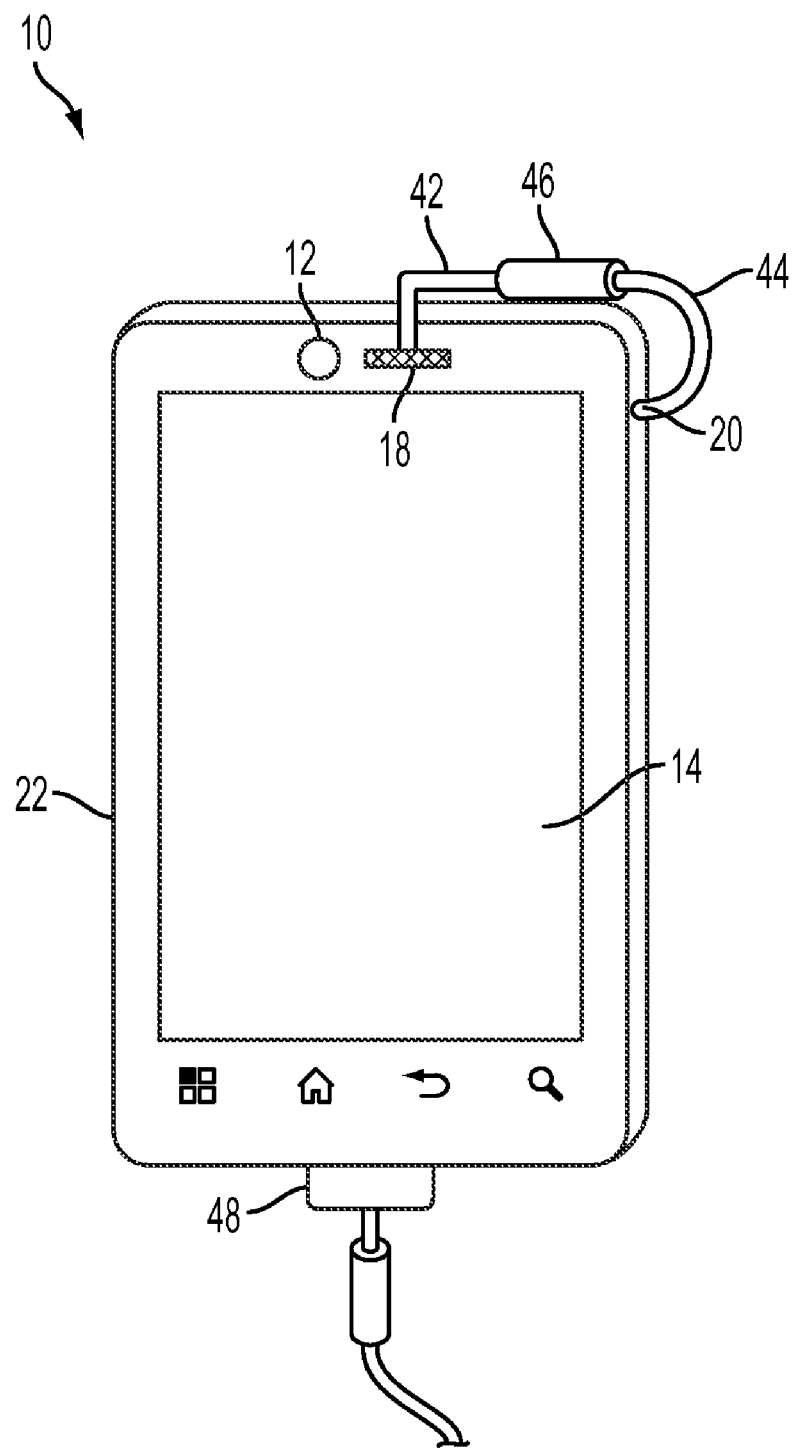
FIG. 1 illustrates an example of a portable electronic device with an attached position sensing circuit.

FIG. 1 illustrates an example of a portable electronic device 10 having an optical sensor 12. In this document, a "portable electronic device" refers to an electronic device that includes a processor, a computer-readable memory, and a communications device such as a transceiver or communications port that enables the device to send and receive signals via one or more wireless communications networks. Portable electronic devices may include, for example smart phones, digital cameras, personal digital assistants, laptop computers, tablet computing devices, media players and the like. The electronic device 10 may include an optical sensor 12, a display 14, an audio output 20 such as a speaker or a headphone jack, and an audio input 18 such as a microphone. The optical sensor 12 may be any image-capturing sensor that converts optical signals into electrical signals or data, such as a camera having a lens. The portable electronic device 10 will include a processor and a memory that stores programming instructions, such as a software application, that implements the methods described below. In some embodiment, the audio output and audio input may be components of a single port, such as a universal serial bus (USB) port, or a multi-pin connector.

The portable electronic device may be attached to or include a position sensor that includes an audio signal input 42, an audio signal output 44, and a position sensing circuit 46 that is contained within a housing 22 made of a non-conductive material such as plastic. The audio signal input 42 may include a microphone that is positioned near a speaker of the portable electronic device, or it may include a jack or wire that that is configured to be physically connected to a port 20 (such as a headphone port or other audio output) of the electronic device. The audio signal output 44 may include a jack or wire that that is configured to be physically connected to an audio input (such as a port 20, which may provide input and/or output functions) of the electronic device, or it may include a speaker positioned near a microphone of the electronic device so that the microphone can detect audio signals that are projected by the speaker. In some embodiments, the audio signal output and audio signal input may be integrated into a single connection device 48, such as a single jack. A USB connector or a multi-pin connector in which one or more of the pins correspond to the input and others correspond to the output. Instead of being externally attached to the device, as shown in FIG. 1, in some embodiments the position sensing circuit may be integral with the device and fully contained within the device's housing 22.

Figure 2:
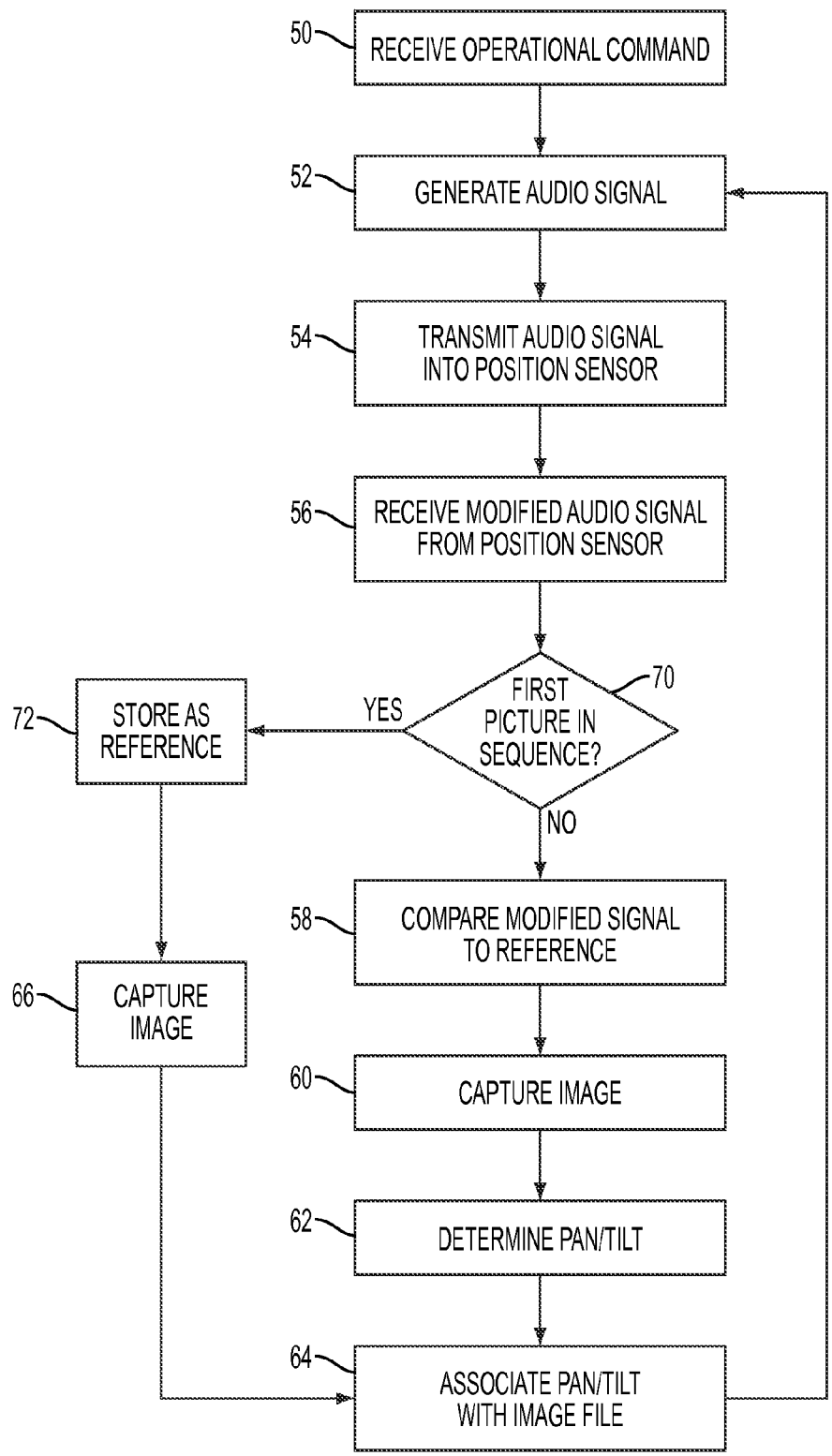
FIG. 2 is a flowchart describing how a portable electronic device may use a position sensing circuit.

FIG. 2 is a flowchart describing a process that programming instructions, such as those contained in a software application may cause the electronic device to implement. The device may receive an operational command 50 from a user of the electronic device. If the electronic device is equipped with a camera, the command may include a command to operate the camera. The camera operation command may be a command to launch a camera application, to take a picture, or some other command relating to the camera. Alternatively, the camera operation command may be a command to activate the position sensor application before a picture or a sequence of pictures is to be taken. If the electronic device is attached to or placed within another apparatus, such as a child's toy, an item of equipment, or another item, the operational command may be a command to operate that apparatus or item.

In response to receiving the operational command 50, the device may generate an audio signal 52 of known amplitude and cause the signal to be transmitted into the position sensor circuit 54. The position sensor circuit will output a modified audio signal, and the electronic device will receive the modified audio signal 56 via its audio input.

The device will compare the amplitude of the received audio signal with a reference amplitude 58 and determine a pan/tilt measurement 62 that corresponds to an angular position of the electronic device. The reference amplitude may be an amplitude for which the device will be known to be positioned to have no pan or tilt, or a predetermined amount of pan and/or tilt. If the received audio signal has the same amplitude as the reference amplitude, it will be determined that the device is positioned straight up and down with no pan or tilt (or in the position of predetermined pan and tilt). On the other hand, if the received audio signal has an amplitude that differs from the reference amplitude, the device may determine that the device is skewed and determine a pan/tilt measurement 62 that is associated with the amount and direction of the skew. The pan/tilt measurement may be determined by any suitable method, such as by comparing the amplitude of the received signal with data contained in the memory (such as a lookup table) that correlate known pan/tilt measurements with known amplitude or amplitude difference measurements. In this situation, the processor may determine the stored amplitude or amplitude difference that most closely matches that of the received signal, and it may use that amplitude's corresponding pan/tile measurement as that for the device. Alternatively, the pan/tilt measurement may be determined based on the received signal amplitude using a formula or equation that is suitable for the parameters of the electronic device. An example of such an equation is a linear or polynomial equation that translates a signal amplitude to a positional measurement.

While the device is receiving the modified audio signal, the device also may receive a command to capture an image 60 and store the image as an image file. When this happens, the device will determine the pan/tilt measurement 62 substantially simultaneously with moment when the image is captured, and it will store the pan/tilt measurement in a memory in a format that associates the measurement with the image file 64. For example, the device may store the pan/tilt measurement as metadata with the image file, or it may store multiple pan/tilt measurements in a data file that also includes data correlating each pan/tilt measurement with its corresponding image. The device may then repeat the process as additional images are captured. As used in this document, the phrase "substantially simultaneously" means at the same time, or within an extremely short time period, such that the electronic device's pan/tilt measurement does not appreciably change during the time period. In some embodiments, the time period will be such that any change in the electronic device's pan/tilt measurement will be less than a 5 percent change. In other embodiments it may be less than a 1 percent change.

In an alternate embodiment, rather than using the generated audio signal as a reference amplitude, in a system where multiple images are taken in sequence the device may determine whether an image is the first image in a sequence 70. For example, the device may determine that an image is a first image if it has received a command to take a sequence of photos that will be presented together as a panoramic image. If it determines that the image is a first picture in a sequence 70, it may store the amplitude of the signal as the reference amplitude. Then, when the system captures the first image 66, it will associate a reference pan/tilt measurement (such as zero) with the first image so that the pan/tilt measurements for all other images captured in the sequence are compared with the first image as a reference.

Figure 3:
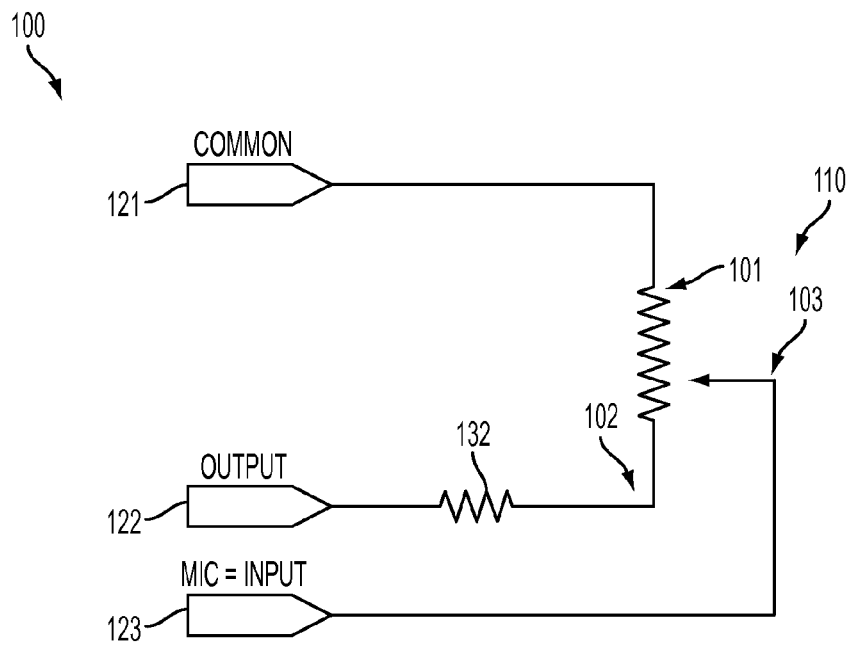
FIG. 3 illustrates an example of a position sensing circuit.

FIG. 3 illustrates an example of a position sensing circuit 100 according to an embodiment. This embodiment of the circuit 100 includes a potentiometer 110 having a first terminal 101 that is electrically connected to a common or ground wire 121, a second terminal 102 that is electrically connected to an audio signal output 122, and a third terminal 103 or wiper that is electrically connected to an audio signal input 123 of the circuit 100. Optionally, one or more resistors may be positioned between any terminal of the potentiometer and its corresponding input or output. For example, a resistor 132 may be electrically positioned between the circuit's audio signal output 122 and the second terminal 102 of the potentiometer to form a voltage divider with the potentiometer and attenuate the signal down to a voltage level that is within a suitable range for the electronic device's input.

When the position sensor circuit 100 is attached to an electronic device, the position of the wiper 103 will move as the device's angular position changes. For example, if the device's housing is tilted along an x-axis, or panned forward along a z-axis, the wiper will move, thus changing the resistance of the potentiometer and thus also changing the voltage amplitude of the output signal. If the position sensor circuit receives an audio signal of a known amplitude and outputs an audio signal of the same (or a known) amplitude, as the wiper moves the amplitude of the output signal will change.

Figure 4:
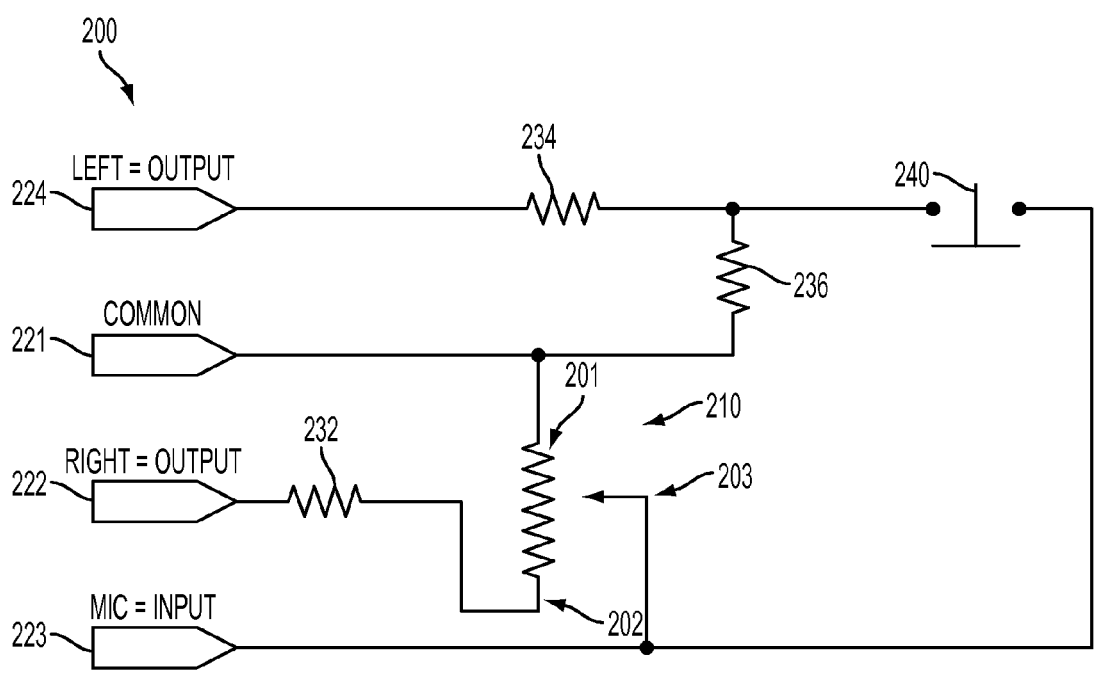
FIG. 4 illustrates an example of an alternate position sensing circuit.

FIG. 4 illustrates an example of a position sensing circuit 200 according to an alternate embodiment. The circuit 200 includes a potentiometer 210 having a first terminal 201 that is electrically connected to a common or ground wire 221, a second terminal 202 that is electrically connected to a first audio signal output 222, and a third terminal 203 or wiper that is electrically connected to an audio signal input 223 of the circuit. Optionally, one or more resistors may be positioned between any terminal of the potentiometer and its corresponding electrical connection. For example, a resistor 232 may be positioned between the audio signal output 222 and the second terminal 202 of the potentiometer.

In the embodiment of FIG. 4, the first terminal 201 of the potentiometer also may be electrically connected to a second audio signal output 224. The first and second audio signal outputs may correspond to right and left channels of a stereo output. One or more resistors 234 also may be positioned between the first terminal 201 of the potentiometer and the second audio signal output 224. Optionally, a switch 240 may be positioned between the signal input 223 and the second output 224 to allow selective measurement either the potentiometer and switch combination (in a closed position), or the potentiometer alone when the switch is open.

When the position sensor circuit 200 is attached to an electronic device, the position of the wiper 203 will move as the device's angular position changes. For example, if the device's housing is tilted along an x-axis, or panned forward along a z-axis, the wiper will move. If the position sensor circuit receives an audio signal of a known amplitude and outputs an audio signal of the same (or a known) amplitude, as the wiper moves the amplitude of the output signal will change.

Figure 5:
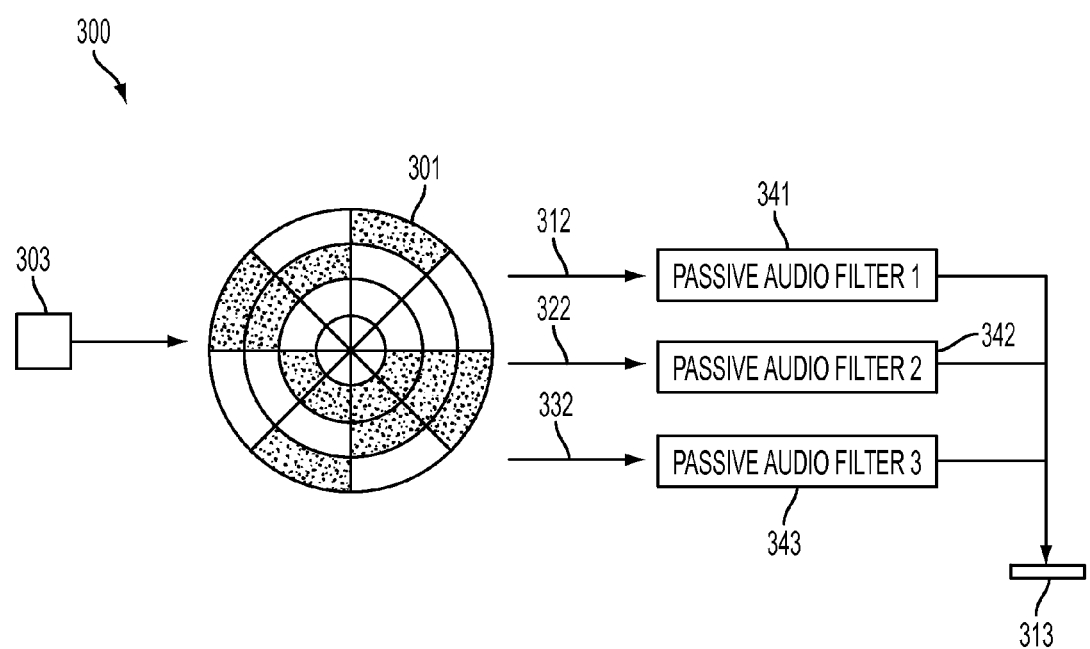
FIG. 5 illustrates another example of a position sensing circuit.

FIG. 5 illustrates yet another embodiment of a position sensing circuit 300. In this embodiment, an angle transducer such as a digital rotary encoder 301 receives a signal from an audio input 303 and produces a digital output code such as a three-bit binary output 312, 322, 332. The encoder rotates around a shaft, and the digital output code will vary based on the rotational position of the encoder. The digital output code will vary based on the angular position of the transducer. Each bit of the code may be passed through a passive audio filter 341, 342, 343, such as a LC bandpass filter, to produce an analog signal or tone signal. The tone signal may then be sent to an audio input of the electronic device 313, which then may determine the position of the device based on the frequency of the tone signal. The position may be determined using any suitable method, such as by comparing the received frequency with a data set containing reference parameters (such as known frequencies) and their corresponding angular positions. The device may then identify an angular position in the data set that corresponds to the received frequency.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising:
outputting, via an audio output of a portable electronic device, a first tone having a first parameter value;
transmitting the tone into a position sensing circuit;
receiving, via an audio input of the portable electronic device from the position sensing circuit, a second tone of a second parameter value; and
determining, by a processor of the electronic device, an angular positional measurement by comparing the second parameter value to a reference parameter value.

2. The method of claim 1, wherein the angular positional measurement comprises a pan/tilt measurement.

3. The method of claim 2, further comprising:
receiving a camera operation command;
capturing, by an optical sensor of the portable electronic device, image data substantially simultaneously with the receiving of the second tone;
storing the image data as an image file in a memory; and
storing, in the memory in association with the image file, the pan/tilt measurement.

4. The method of claim 3, wherein storing the pan/tilt measurement comprises including the pan/tilt measurement in the image file.

5. The method of claim 1, wherein determining the angular positional measurement comprises:
measuring a difference between the reference parameter value and the second parameter value;
accessing a stored plurality of known differences and corresponding angular positional values; and
selecting, as the angular positional measurement, an angular positional value that corresponds to the known difference that most closely matches the measured difference.

6. The method of claim 1, wherein the reference parameter value equals the first parameter value.

7. The method of claim 3, further comprising:
determining that the image file corresponds to a reference image in an image sequence;
setting the reference parameter value to equal the second parameter value; and
repeating the step of determining an angular positional measurement for a plurality of additional images.

8. The method of claim 1, wherein:
the position sensing circuit comprises a potentiometer, and each of the parameter values comprises an amplitude.

9. The method of claim 1, wherein:
the position sensing circuit comprises a digital rotary encoder and at least one audio filter, and
each of the parameter values comprises a frequency.

10. An electronic device, comprising:
an audio signal output;
an audio signal input;
a processor;
an optical sensor; and
a memory containing programming instructions that instruct the processor to cause the device to:
output, via the audio signal output, a first signal, wherein the first signal has a first amplitude;
receive, via the audio signal input, a second signal, wherein the second signal has a second amplitude; and
in response to receiving a command to capture an image via the optical sensor, determine a pan/tilt measurement by measuring a difference between the first amplitude and the second amplitude,
accessing a stored plurality of known differences and corresponding angular positional values, and
selecting, as the pan/tilt measurement, an angular positional value that corresponds to a known difference out of the stored plurality of known differences that most closely matches the measured difference.

11. The device of claim 10, further comprising a position sensing circuit that is configured to receive the first signal from the audio signal output, modify the first signal to yield the second signal, and direct the second signal to the audio signal input.

12. The device of claim 11, wherein the position sensing circuit comprises:
a digital rotary encoder; and
at least one filter that coverts the first signal into the second signal.

13. The device of claim 11, wherein the position sensing circuit comprises a potentiometer.

14. The device of claim 10, further comprising programming instructions that instruct the processor to cause the device to:
capture, by the optical sensor of the electronic device, the image substantially simultaneously with the receiving of the second signal;
store the image as an image file in the memory; and
store, in the memory in association with the image file, the pan/tilt measurement.

15. The device of claim 14, further comprising programming instructions that instruct the processor to cause the device to:
determine that the image file corresponds to a reference image in an image sequence;
set the first amplitude to equal the second amplitude; and
determining an angular positional measurement for each of a plurality of additional images.

16. The device of claim 11, wherein:
the audio signal input comprises a first channel and a second channel;
a first terminal of the position sensing circuit is electrically connected to the first channel; and
the position sensing circuit further comprises a second terminal that is electrically connected to the second channel.

17. The device of claim 10, wherein the audio signal output and the audio signal input are both elements of a single port.

18. An electronic device, comprising:
an audio signal output;
an audio signal input;
a position sensing circuit that is configured to receive a first signal from the audio signal output, modify the first signal to yield a modified signal, and direct the modified signal to the audio signal input;
a processor,
an optical sensor, and
a memory containing programming instructions that instruct the processor to cause the device to:
output, via the audio signal output, the first signal;
receive, via the audio signal input, the modified signal; and
in response to receiving a command to capture an image via the optical sensor, determine a pan/tilt measurement by comparing a parameter value of the modified signal to a reference signal parameter value.

19. The device of claim 18, wherein the position sensing circuit comprises a potentiometer.

20. The device of claim 18, wherein the position sensing circuit comprises:
a digital rotary encoder; and
at least one filter that coverts the first signal into the modified signal.

21. The device of claim 18, further comprising programming instructions that instruct the processor to cause the device to:
capture, by the optical sensor of the electronic device, the image substantially simultaneously with the receiving of the modified signal;
store the image as an image file in the memory; and
store, in the memory in association with the image file, the pan/tilt measurement.

22. The device of claim 21, further comprising programming instructions that instruct the processor to cause the device to:
determine that the image file corresponds to a reference image in an image sequence;
set the reference parameter value to equal the parameter value; and
determining an angular positional measurement for each of a plurality of additional images.

23. The device of claim 18, wherein the programming instructions that instruct the processor to cause the device to determine the pan/tilt measurement comprise instructions to:
measure a difference between the reference parameter value and the parameter value;
access a stored plurality of known differences and corresponding angular positional values; and
select, as the pan/tilt measurement, an angular positional value that corresponds to the known difference that most closely matches the measured difference.

24. The device of claim 18, wherein:
the audio signal input comprises a first channel and a second channel;
a first terminal of the position sensing circuit is electrically connected to the first channel; and
the position sensing circuit further comprises a second terminal that is electrically connected to the second channel.

25. The device of claim 18, wherein the audio signal output and the audio signal input are both elements of a single port.

* * * * *